(12) United States Patent
Rech et al.

(10) Patent No.: US 10,700,471 B2
(45) Date of Patent: Jun. 30, 2020

(54) SYSTEM, METHOD AND MEANS FOR CONNECTING AND FIXING AN ELECTRONIC CONTROL TO AN AIRTIGHT COMPRESSOR AND AN AIRTIGHT COMPRESSOR

(71) Applicant: EMBRACO INDÚSTRIA DE COMPRESSORES E SOLUÇÕES EM REFRIGERAÇÃO LTDA., Joinville, SC (US)

(72) Inventors: Rafael Burg Rech, Joinville (BR); Marcelo Zanelato, Joinville (BR)

(73) Assignee: Embraco Indústria de Compressores e Soluções em Refrigeração Ltda. (BR)

( * ) Notice: Subject to any disclaimer, the term of this patent is extended or adjusted under 35 U.S.C. 154(b) by 814 days.

(21) Appl. No.: 15/392,690

(22) Filed: Dec. 28, 2016

(65) Prior Publication Data
US 2017/0207567 A1 Jul. 20, 2017

(30) Foreign Application Priority Data

Jan. 15, 2016 (CN) .................... 2016 2 0154651 U
Jun. 14, 2016 (BR) ........................... 102016013676

(51) Int. Cl.
*H01R 13/52* (2006.01)
*F04B 39/14* (2006.01)
(Continued)

(52) U.S. Cl.
CPC .......... *H01R 13/521* (2013.01); *F04B 35/04* (2013.01); *F04B 39/121* (2013.01); *F04B 39/14* (2013.01);
(Continued)

(58) Field of Classification Search
None
See application file for complete search history.

(56) References Cited

U.S. PATENT DOCUMENTS

8,441,160 B2 * 5/2013 Watanabe ............. F04C 23/008
310/71
8,742,709 B2 * 6/2014 Watanabe ........... F04B 39/0027
318/400.26
(Continued)

*Primary Examiner* — Xanthia C Cunningham
(74) *Attorney, Agent, or Firm* — Fay Sharpe LLP (57) ABSTRACT

A system, method and arrangement (100) for connecting and fixing an electronic control (50) to an airtight compressor (200) comprising a printed-circuit board (10), an outer housing (150) and an electronic control connector (30), the electronic control (50) and the electronic control connector (30) being arranged on the printed-circuit board (10), the electronic control connector (30) being electrically connected to the electronic control (50), the printed-circuit board (10) simultaneously establishing contact with the airtight compressor (200) by contact with the fence (201) of the airtight compressor (200), electric connection with the airtight compressor (200) by an electric connection between the electronic control connector (30) and an airtight compressor connector (210) and establishing grounding an electromagnetic interference filtering circuit (130) with the airtight compressor (200), the outer housing (150) encapsulating the printed-circuit board (10) and being fixed to the fence (201) of the airtight compressor (200).

22 Claims, 10 Drawing Sheets (51) Int. Cl.
*F04B 39/12* (2006.01)
*F04B 35/04* (2006.01)
*F04B 49/06* (2006.01)
*H01R 13/719* (2011.01)
*H02P 27/06* (2006.01)

(52) U.S. Cl.
CPC .......... *F04B 49/06* (2013.01); *H01R 13/719* (2013.01); *H02P 27/06* (2013.01)

(56) References Cited

U.S. PATENT DOCUMENTS

| | | | | |
|---|---|---|---|---|
| 2007/0063603 A1* | 3/2007 | Levine | ............ | D06F 37/206 |
| | | | | 310/85 |
| 2011/0261588 A1* | 10/2011 | Hattori | ............ | F04B 39/121 |
| | | | | 363/13 |
| 2012/0200164 A1* | 8/2012 | Nakatsu | ............ | B60L 50/64 |
| | | | | 307/82 |

* cited by examiner

FIG. 10

SYSTEM, METHOD AND MEANS FOR CONNECTING AND FIXING AN ELECTRONIC CONTROL TO AN AIRTIGHT COMPRESSOR AND AN AIRTIGHT COMPRESSOR

CROSS REFERENCE TO RELATED APPLICATIONS

This application claims priority under 35 USC 119 to Chinese Patent Application No. 201620154651.0 filed Jan. 15, 2016 and Brazilian Patent Application No. BR102016013676-8 filed Jun. 14, 2016, and the entire disclosure of each of these applications is hereby expressly incorporated by reference into the present application.

FIELD OF THE INVENTION

The present invention relates to a system, a method and means for connecting and fixing an electronic control arranged on a printed-circuit board, wherein an electric connection is established with the connector of said airtight compressor, encapsulation of the electronic control and fixation to a fence of the airtight compressor. The invention further refers to an airtight compressor, which is connected to an electronic control by the described means.

BACKGROUND OF THE INVENTION

In order to achieve high energetic efficiency and cooling, household and commercial cooling systems use nowadays variable capacity compressors (VCC). Such compressors have, as a characteristic, adjustments in the cooling capacity by varying the cooling-gas pumping velocity, that is, the velocity of the mass flow thereof according to the need of the system and its demand for cooling.

The variation of the mass flow takes place from a minimum value to a maximum value, this value range being proportional to the rotation of the electric motor that drives the airtight variable capacity compressor. Rotation variation is achieved on these compressors by means of an electric control called frequency inverter, which adjusts the voltage and frequency applied to the electric motor.

In general, the frequency inverter is provided with a number of electronic circuits with different functions, as for example, a power circuit with input stage for filtering electromagnetic interference and a "rectifying bridge" stage for converting an alternating voltage from an external feed source to a direct voltage, a control circuit (Digital Signal Processor—DSP), an auxiliary feed source for generating the internal voltages for other circuits of components of the inverter, a circuit formed by power semiconductors to actuate the electric motor employed on the compressor, among others.

One observes that the electric connection and fixation of the frequency inverter to the airtight compressor requires one to carry out a number of steps in the production line. This results in loss of efficiency and high cost in the production and mounting of the frequency inverter.

Another problem observed refers to the use of cables for electric connection between the frequency inverter and the connector, which generally is provided with three pins, of the airtight compressor. The use of a cable requires fixation thereof to the printed-circuit board of the frequency inverter, which results in an increase in the general production costs and time, due to the need to weld the cable to the inverter board or to the use of an additional connector on the board.

Additionally, one observes in the prior art that the frequency inverter is arranged in a closed plastic housing, which fits onto a fence of the airtight compressor, being attached by means of screws in order to meet the regulation requirements.

The above problems are observed upon carrying out the steps of fixing the frequency inverter to the fence of the airtight compressor, which will be detailed hereinafter.

The first step is carried out by fixing the components and circuits that compose the frequency invertor to the printed-circuit board.

After this step, the connector for feeding the motor of the airtight compressor is mounted onto the printed-circuit board. The grounding connector of the electromagnetic interference filtering (ground connection point) is mounted to the printed-circuit board.

The grounding derivation terminal is pressed onto the plastic body of the outer housing.

The printed-circuit board is then mounted onto the plastic base of the plastic body of the outer housing.

A motor connection cable is attached to the connector for feeding the airtight compressor motor previously mounted to the printed-circuit board. A grounding cable of the electromagnetic interference filtering circuit is connected to the connector located on the printed-circuit board.

The cable from the grounding connector of the electromagnetic interference filtering circuit is connected to the grounding terminal attached to the plastic body.

The plastic body of the outer housing is mounted onto the plastic base, so that the previously mounted cables pass through orifices existing in said body.

The plastic cover is then closed, making interface with the plastic base and body, the cover is screwed to the base-and-body assembly, the motor cable connector is coupled to the connector of the airtight compressor, a derivation of the grounding cable of the electromagnetic interference filtering circuit is coupled to the ground terminal of the compressor, the plastic assembly is fitted to the compressor through the orifice existing in the plastic body and the assembly is fixed to the airtight compressor by means of screws.

SUMMARY OF THE INVENTION

Thus, the prior art does not present means of connecting and fixing a frequency inverter in an airtight compressor that enables elimination of the cables for connection to the airtight compressor and to the ground terminal of the compressor, the use of less plastic material on the outer housing and fewer steps for connection and fixation of the frequency inverter to the fence of the airtight compressor.

A first objective of the present invention is to provide means for connection and fixation of an electronic control, which require fewer steps necessary to assemble it and then connect and fix it to the airtight compressor.

A second objective of the present invention is to provide means for connecting and fixing an electronic control which eliminate the need to use cables for connection to the airtight compressor.

A third objective of the present invention is to provide means for connecting and fixing an electronic control which use less plastic material on the outer housing.

A fourth objective of the present invention is to provide means for connecting and fixing an electronic control which will have lower manufacturing costs.

A fifth objective of the present invention is to provide means for connecting and fixing an electronic control which will have lower costs in the operation for mounting it to the compressor.

The objectives of the present invention are achieved by means for connecting and fixing an electronic control to an airtight compressor comprising:

a printed-circuit board provided with a first face and a second face;

an outer housing;

at least one resting means;

an electronic control connector; and external feed terminals, said at least one resting means being fixed to the first face and to the second face of the printed-circuit board;

the electronic control, the electronic control connector and the external feed terminals being arranged on at least one of the faces of the printed-circuit board;

the electronic control connector being electrically connected to the electronic control, the electronic control being electrically connected to the external feed terminals;

the printed-circuit board simultaneously:

establishing contact with the airtight compressor by contact between said at least one resting means arranged on the second face and a fence of the airtight compressor;

establishing electric connection with the airtight compressor by means of an electric connection between the electronic control connector and a connector of the airtight compressor; and establishing grounding of an electromagnetic interference filtering circuit of the electronic control with the airtight compressor;

the outer housing encapsulating the printed-circuit board with the electronic control, with said at least one laying and with the electronic control connector;

the outer housing establishing contact with said at least one resting means on the first face, the outer housing being attached to the fence of the airtight compressor.

The objectives of the present invention are also achieved by means of a system for connecting and fixing an electronic control in an airtight compressor in which the electronic control comprises at least one resting means, an electronic control connector, an electromagnetic interference filtering circuit and external feed terminals, the electronic-control connector being electrically connected to the electronic control, the electronic control being electrically connected to the external feed terminals; and the airtight compressor comprises a fence and a connector of the airtight compressor, the system simultaneously establishing an electrical connection between the connector of the electronic control and the connector of the airtight compressor, a grounding of the electromagnetic interference filtering circuit of the electronic control with the airtight compressor and a contact between the at least one resting means of the electronic control and the fence of the airtight compressor, the electronic control being encapsulated by an outer housing, the outer housing making contact with at least one resting means of the electronic control, the outer housing being fixed to the fence of the airtight compressor.

Moreover, the objectives of the present invention are achieved by means of a method for connecting and fixing an electronic control to an airtight compressor comprising:

moving the electronic control toward the airtight compressor until an electronic-control connector and an airtight-compressor connector are aligned with each other;

establishing contact between at least one resting means arranged on the electronic control and a fence of the airtight compressor;

establishing an electric connection between the electronic-control connector and the airtight-compressor connector.

establishing grounding of an electromagnetic interference filtering circuit of the electronic control with the fence of the airtight compressor;

encapsulating the electronic control with an outer housing;

establishing a contact between the at least one resting means and the outer housing; and fixing the outer housing to the fence of the airtight compressor.

Finally, the objectives of the present invention are achieved by means of an airtight compressor controlled by an electronic control, in which the electronic control comprises at least one resting means, an electronic control connector, an electromagnetic interference filtering circuit and external feed terminals, the connector of the electronic control being electrically connected to the electronic control, the electronic control being electrically connected to the external feed terminals; and the airtight compressor comprises a fence and an airtight compressor connector, the compressor establishing simultaneously an electrical connection with the connector of the electronic control, a grounding of electromagnetic interference filtering circuit of the electronic control and a contact with at least one resting means of the electronic control, the electronic control being encapsulated by an outer housing, the outer housing establishing contact with at least one resting means of the electronic control, the outer housing being fixed to the fence of the airtight compressor.

BRIEF DESCRIPTION OF THE DRAWINGS

The present invention will now be described in greater detail with reference to an example of embodiment represented in the drawings. The figures show.

DETAILED DESCRIPTION

Figure 1:
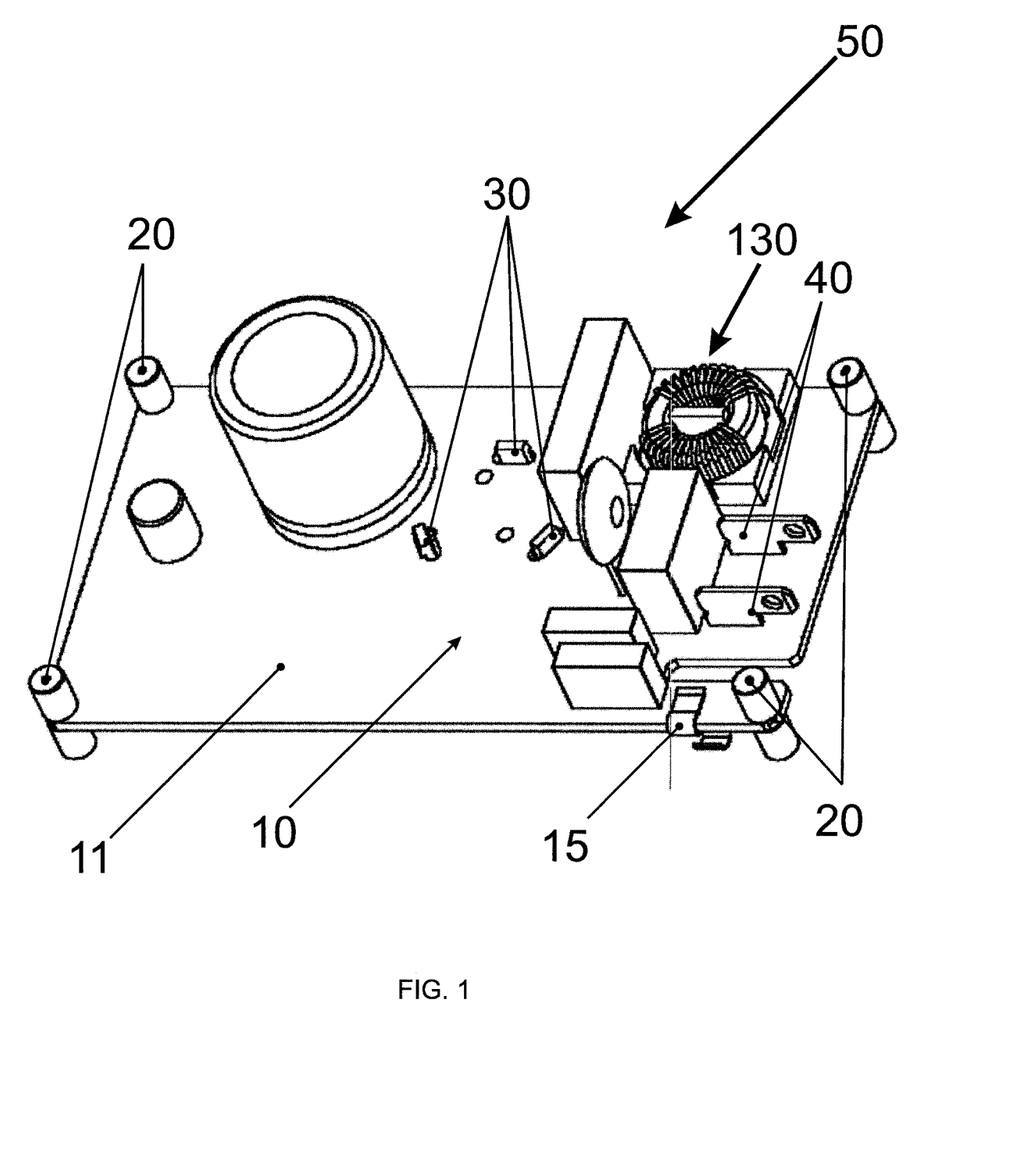
FIG. 1 is an illustration of the electronic control viewed from the first face of the printed-circuit board according to teachings of the present invention.
Figure 2:
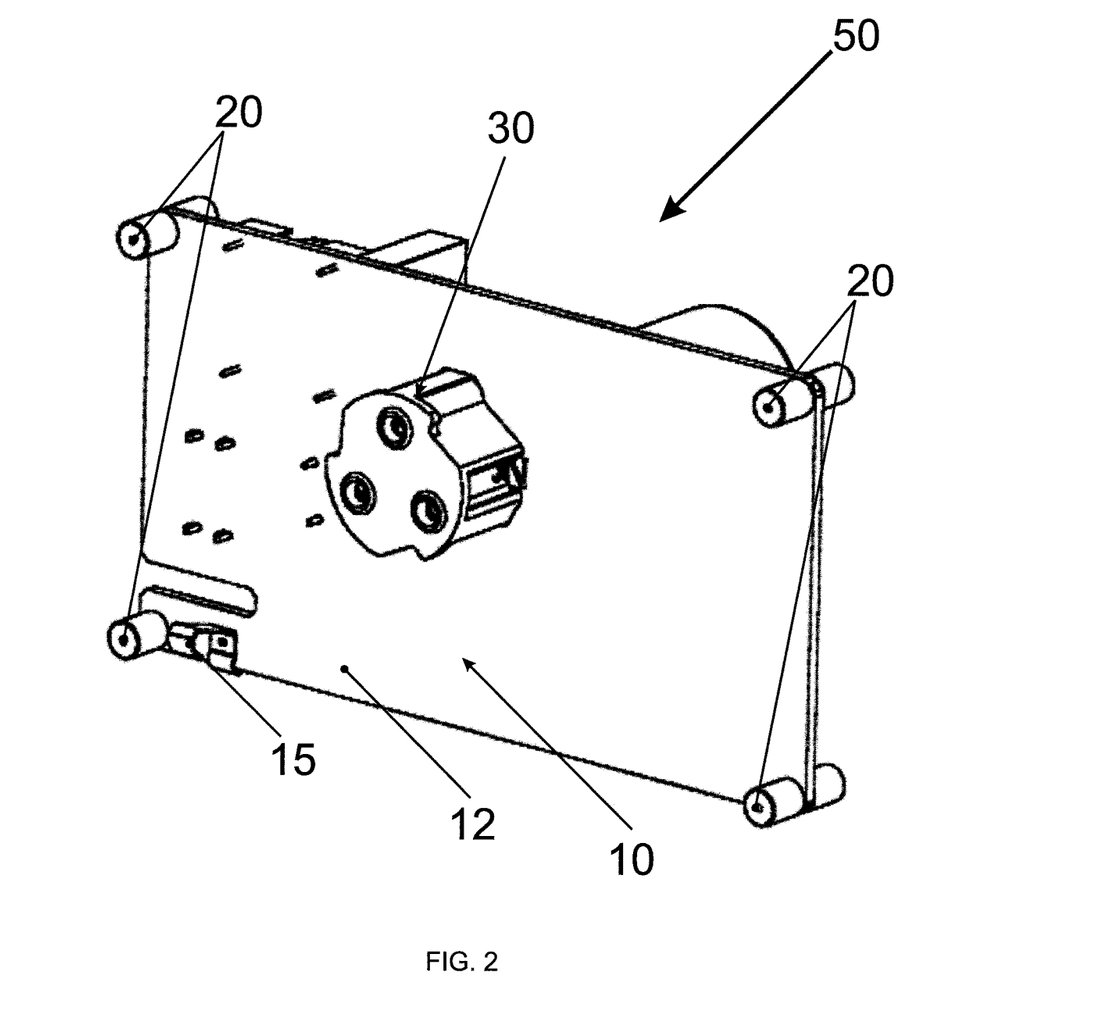
FIG. 2 is an illustration of the connector of the electronic control viewed from the second face of the printed-circuit board according to teachings of the present invention.

FIGS. 1 and 2 show the electronic control 50 of the present invention, used on an airtight compressor 200.

In a preferred embodiment, the electronic control 50 may be a frequency inverter provided with a number of electronic circuits with different functions, as for example, an electromagnetic interference filtering circuit 130 and a "rectifying bridge" stage to convert an alternating voltage from an outer feed source to direct voltage, a control circuit (a microcontroller or Digital Signal Processor), an auxiliary feed source to generate the internal voltages for other circuits or components of the inverter, a circuit formed by power semiconductors to actuate the electric motor employed on the compressor, among others.

Obviously, this is only a preferred embodiment, so that alternatively the electronic control 50 may be another type of component or a set of other components, capable of controlling the airtight compressor 200, such as a starter system for airtight compressor with a single-phase motor, a thermostat system for controlling the temperature of a cooler, a motor control system with Taps for configuration at 110V or 220V, among others.

The electronic control 50 is used for controlling the voltage and frequency applied to the airtight compressor 200, specifically variable capacity compressors (VCC), thus varying the cooling-gas pumping velocity, that is, the velocity of mass flow, according to the need of the system and its demand for cooling.

In a preferred embodiment, the airtight compressor 200 is driven by three-phase BLDC Motors (Brushless DC electric motor). However, it is important to observe that the present invention is not limited to this type of electric motor alone, so that other single-phase, two-phase or three-phase motors may be used, depending on the desired application.

The electric control 50 of the present invention may be arranged on a first face 11 of a printed-circuit board 10, on a second face 12 of the printed-circuit board 10 or on both faces 11, 12. In a preferred embodiment, the first face 11 is that which faces an outer housing 150 and the second face 12 is that facing a fence 201 of the airtight compressor, as will be detailed later. The arrangement on a determined face does not establish a limitative nature nor does this alter the innovative characteristics of the present invention.

In general, the printed-circuit board 10 is a board known from the prior art and may be made from fenolite (phenolic paper), glass fiber, polyester fiber, specific films based on various polymers, among others. The first face 11 and a second face 12 of the printed-circuit board 10 is provided with thin copper films, which establish conductive tracks, where the components of the electronic control 50 are welded and electrically interconnected to each other.

Further with reference to FIG. 1, one can see that the printed-circuit board 10 is provided with external feed terminals 40 of the printed-circuit board 10, the terminals 40 being electrically connected to the electronic control 50 and to an external voltage feed (not shown).

With reference to FIG. 2, one can see that it shows a connector 30 of the electronic control arranged on either of the faces 11, 12 of the printed-circuit board 10. In a preferred configuration, the electronic circuit connector 30 is provided with at least three connections on one of its faces 11, 22, the number of connections depending on the type of motor used (single-phase, two-phase or three-phase).

The connector 30 of the electronic control is electrically connected to the electronic control 50.

On the opposite face 11, 12, the electronic control connector is provided with three female-type connections, which will later be connected to connections of an airtight-compressor connector 210 of the airtight compressor 200, as will be described below.

Further with reference to FIGS. 1 and 2, one can observe that at least one resting means or element 20 is attached to the first face 11 and on the second face 12 of the printed-circuit board 10. In a preferred embodiment, said at least one means 20 is arranged at the ends/vertices of the printed-circuit board 10 in a symmetric manner between both faces 11, 12. The symmetry is provided by connecting said at least one resting means 20 between the faces 11, 12 through a bore through the ends/vertices where it is arranged. It should be noted that this is only a preferred embodiment, so that said at least one means 20 may be arranged in any region of the faces 11, 12 and may be kept connected to each other.

In a preferred embodiment, said at least one resting means 20 is made from elastically deformable materials such as rubbers, polymers, springs or any other materials capable of deforming elastically under a mechanical stress (for example, pressure).

One further observes in FIGS. 1 and 2 that the printed-circuit board 10 is provided with a grounding point 15. Preferably, this grounding point is a metallic hook-shaped contact for subsequent electric connection to a fence 201 of the airtight compressor 200, as will be described later. The grounding connection point 15 is electrically connected to the board 10 and being configured to ground an electromagnetic interference filtering circuit 130, arranged on the printed-circuit board 10.

Obviously, the hook shape is just a preferred embodiment, so that any other type of connection may be used, as long as it is capable of establishing contact with the fence 201.

Figure 3:
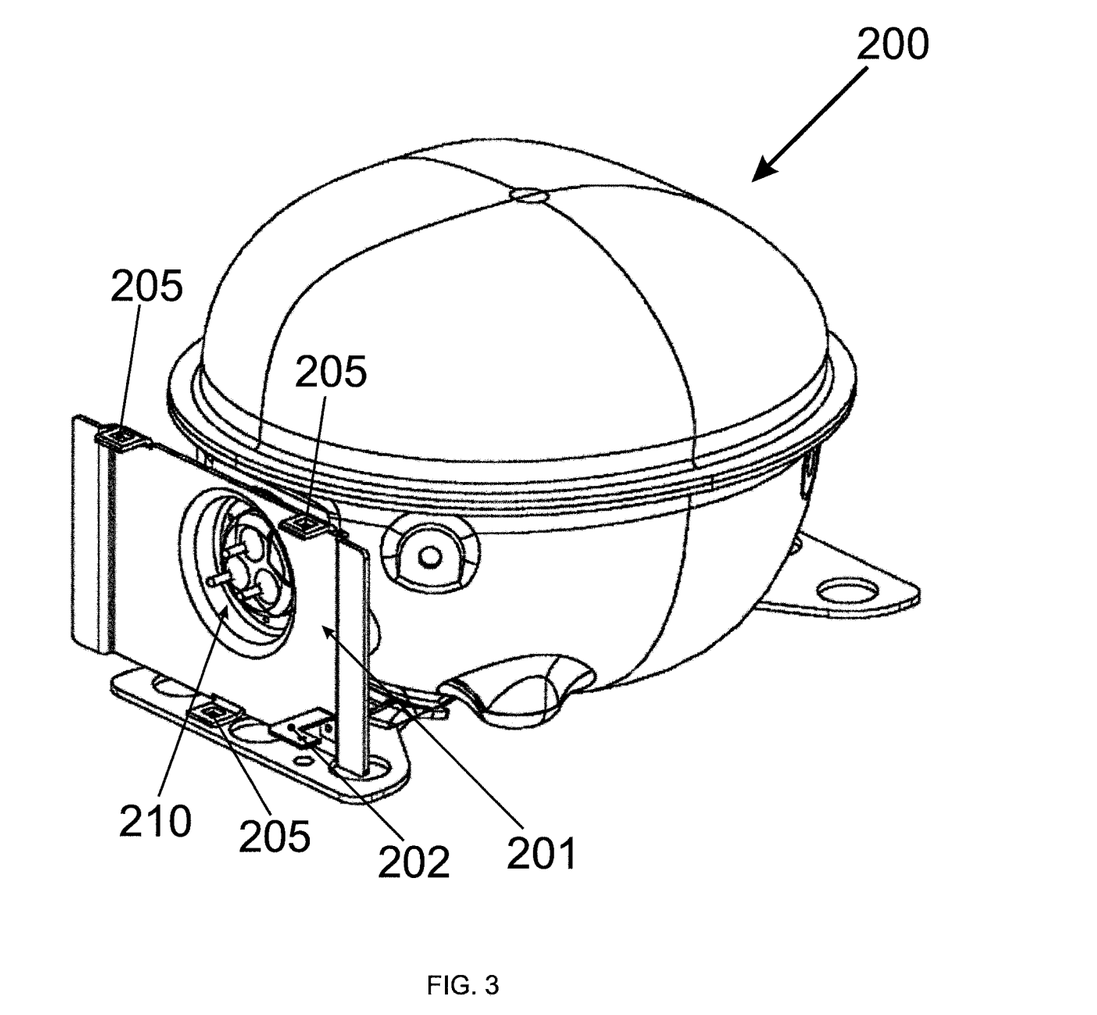
FIG. 3 is an illustration of the airtight compressor showing the fence according to teachings of the present invention.

With regard to the airtight compressor 200, one can observe in FIG. 3 that it is provided with a fence 201 and an airtight compressor connector 210. In a preferred embodiment, the fence 201 has a shape cooperating with the shape of the printed-circuit board 10, since the latter will be attached to it. The fence 201 exhibits a bore in its central region for passage of the airtight compressor connector 210.

Preferably, the airtight compressor connector 210 is provided with at least three connections (male connectors), which are electrically connected to the female-type connections of the electric control connector 30 of the printed-circuit board 10. It should be observed that the number of connections depends on the type of electric motor used (single-phase, two-phase or three-phase). As will be described later, such an electric connection enables the electric motor of the airtight compressor 200 to receive feeding signals from the electronic control 50.

Additionally, FIG. 3 shows that the fence 201 of the airtight compressor 200 is provided with a protrusion 202 and with at least one notch 205.

The protrusion 202 of the fence 201 is configured for subsequent electric connection with the grounding point 15 of the printed-circuit board 10, as will be described in greater detail later. Said at least one notch 205 is configured to receive the outer housing 150 of the connection and fixation means 100. The airtight compressor 200, the protrusion 202, the fence 201 and said at least one notch 205 are made from metallic materials and are all grounded, to prevent damage caused by possible electric discharges and/or short-circuits.

Figure 7:
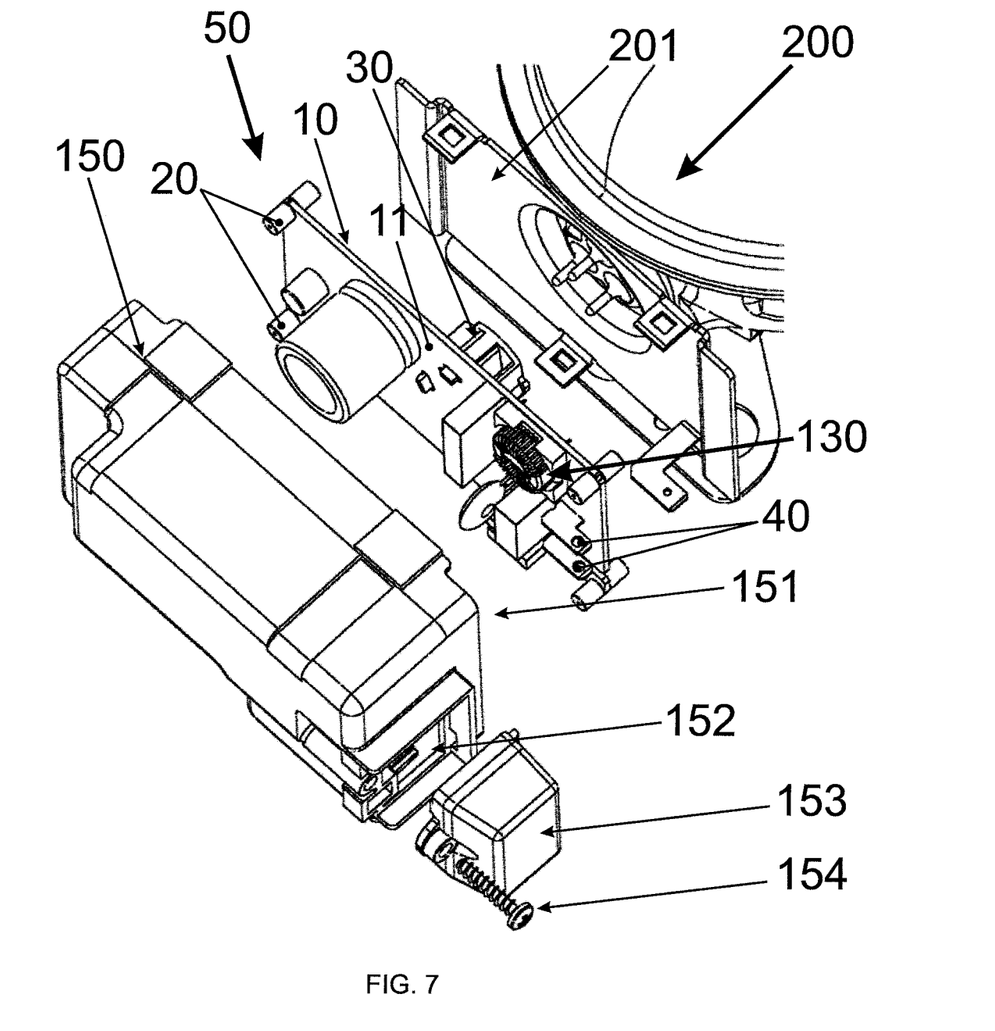
FIG. 7 is an illustration of the electronic control to be connected and fixed, respectively, to the connector of the airtight compressor and to the fence of the airtight compressor; and the outer housing that encapsulates the printed-circuit board with the electronic control and is attached to the fence of the airtight compressor according to teachings of the present invention.

As can be seen in FIG. 7, the outer housing 1050 of the connection and fixation means 100 is provided with an inner cavity 151 and an opening 152, preferably a side one, for access to the external feed terminals 40 of the printed-circuit board 10, as will be described later. The outer housing 150 may be made from any material, especially plastic materials.

Figure 4:
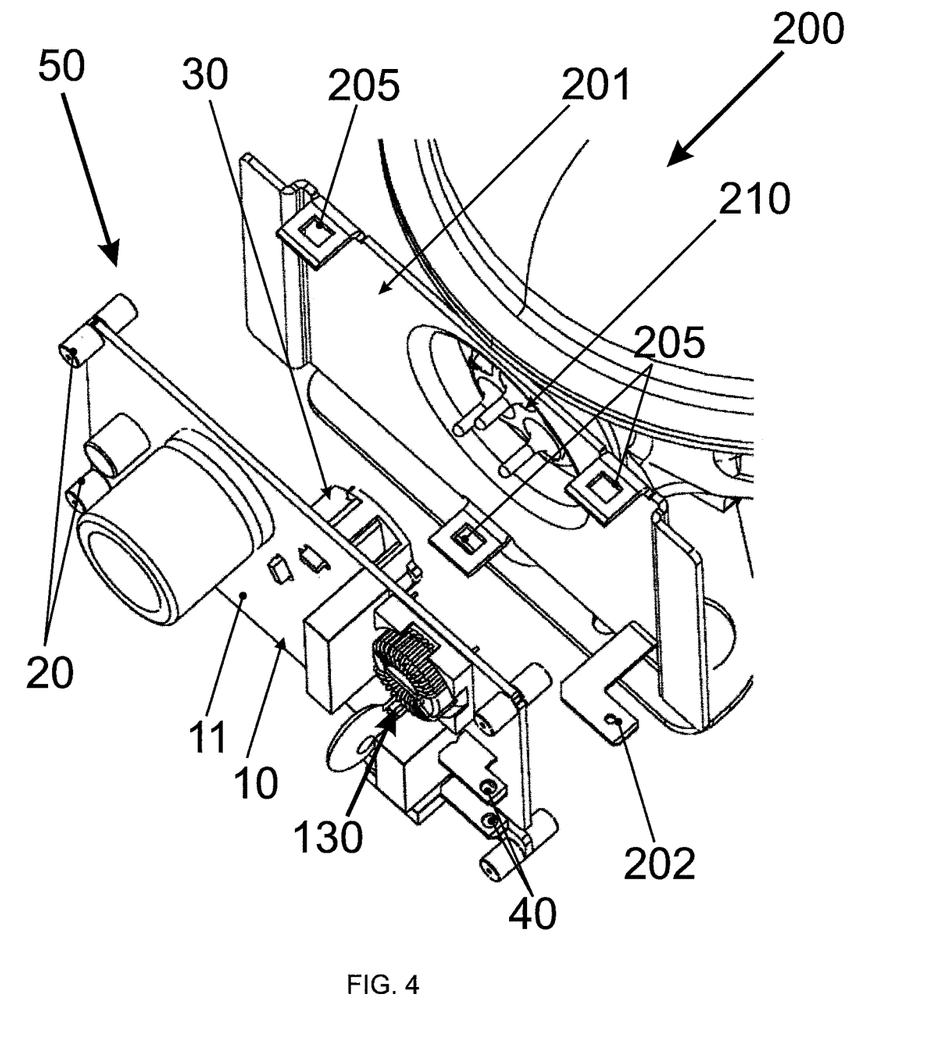
FIG. 4 is an illustration of the electronic control to be connected and fixed, respectively, to the connector of the airtight compressor and to the fence of the airtight compressor according to teachings of the present invention.
Figure 5:
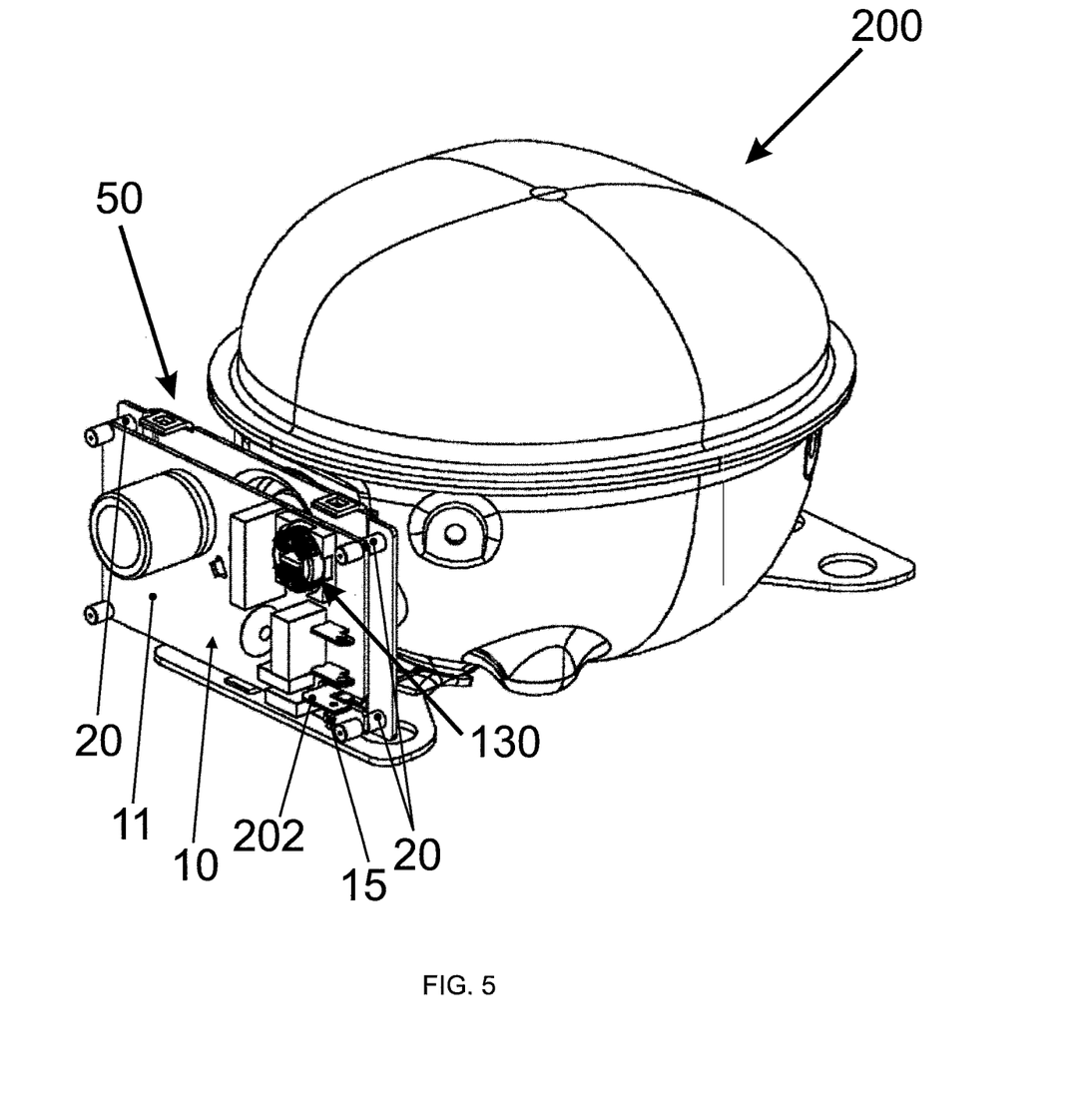
FIG. 5 is an illustration of the electronic control connected and fixed to the airtight compressor according to teachings of the present invention.
Figure 6:
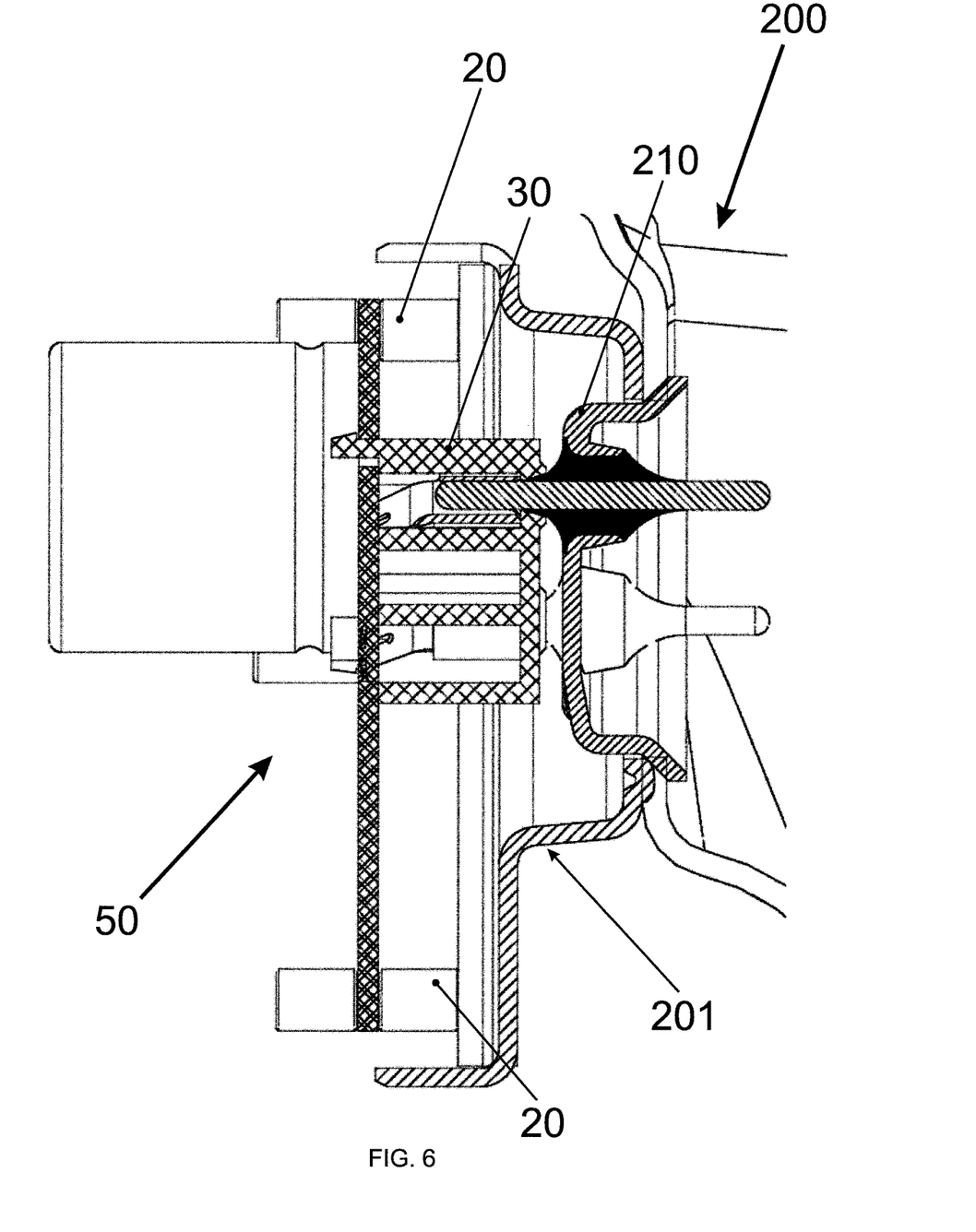
FIG. 6 is a cross-section view of the connection and fixation means of the electronic control to the airtight compressor according to teachings of the present invention.

One can see in FIGS. 4 to 6 the partial mount of the connection and fixation means 100 of the present invention on the airtight compressor 200, especially the electric connection and fixation of the printed-circuit board 10 with the electronic control 50 on the fence 201 of the airtight compressor 200.

The printed-circuit board 10 with the electronic control 50 is placed initially parallel to the fence 201 of the airtight compressor 200 and is moved linearly until the electronic control connector 30 and the airtight compressor connector 210 are aligned to each other.

Thus, one observes that the printed-circuit board 10 simultaneously:
  establishes contact with the airtight compressor 200 by means of a contact between said at least one resting means 20 arranged on the second face 12 and a fence 201 of the airtight compressor 200;
  establishes electric connection with the airtight compressor 200 by means of an electric connection between the electronic control connector 30 and an airtight compressor connector 210; and
  establishes electric connection between the grounding point 15 of the printed circuit board 10 and the protrusion 202 of the fence 201 of the airtight compressor 200.

One can observe that, after the electric connections and mechanical contacts between the above elements have been established, the printed-circuit board 10 is connected and attached, respectively, to the airtight compressor connector 210 and to the fence 201, in a quite stable manner and it is not necessary to use fixation means (such as screws). Moreover, one observes that the electromagnetic interference filtering circuit 130 of the board 10 is grounded, since grounding electric connection has been established with the airtight compression 200.

FIG. 7 illustrates the complete assembly of the connection and fixation means 100 object of the present invention with the hermetic compressor 200, especially the electric connection and fixation of the printed-circuit board 10 with the electronic control 50 on the fence 201 of the airtight compressor, the encapsulation of the printed-circuit board 10 with the electronic control 50 by the outer housing 150 and fixation of the outer housing 150 to the fence 201 of the airtight compressor 200.

After said electric connections and mechanical contacts described before, the outer housing 150 received and encapsulates (covers), in its inner cavity 151, the printed-circuit board 10 with the electronic control 50, with said at least one resting means 20 and with the control and feed connector 30.

After said encapsulation, the outer housing 150 establishes contact with said at least one resting means 20 of the first face 11, the outer housing 150 being attached to the fence 201 of the airtight compressor 200 by means of the notches 205 of the fence 201. The external feed terminals 40 of the printed-circuit board 10 remain accessible from the side opening 102 of the outer housing 150. The side opening 152 is closed by means of a cover 153 and fixed by fixation elements 154 (such as screws).

Figure 8:
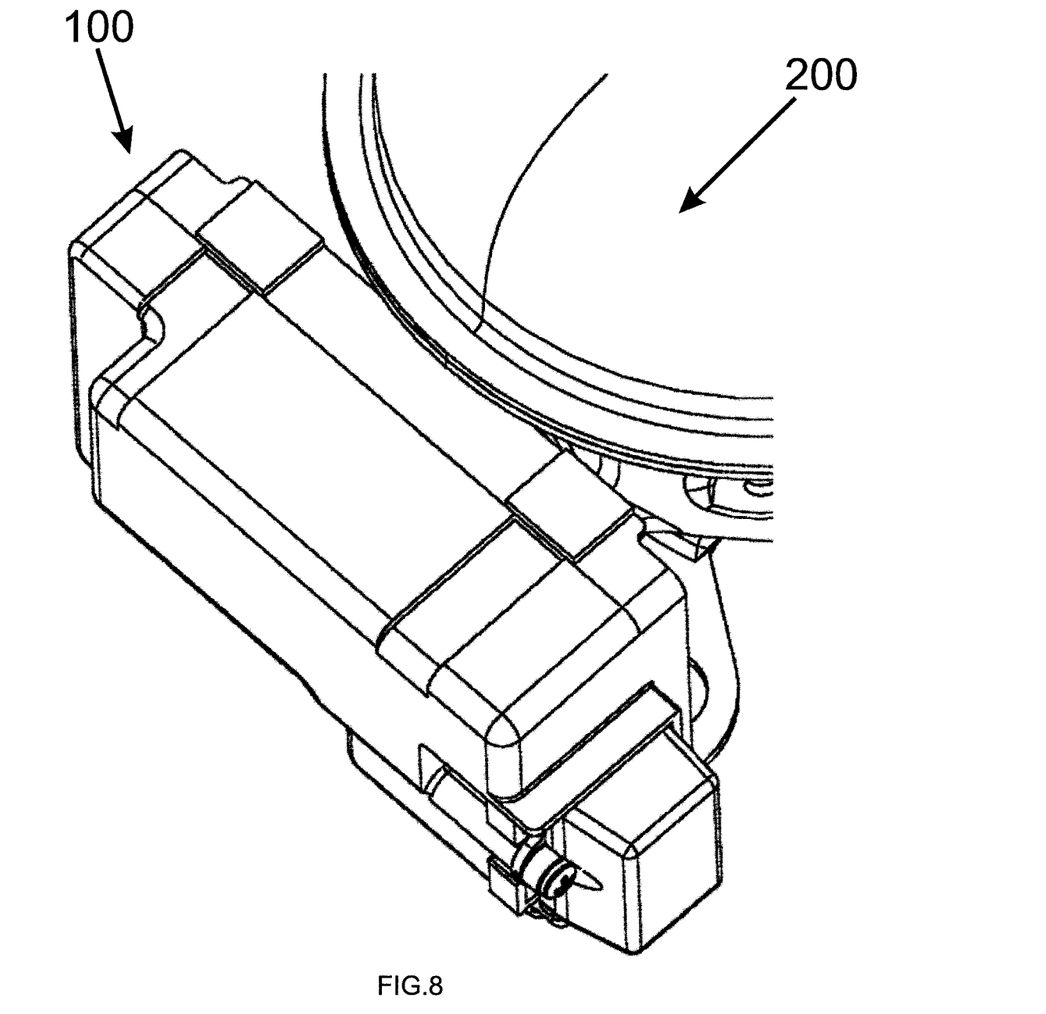
FIGS. 8 and 9 are illustrations of the outer housing encapsulating the electronic control and attached to the airtight compressor according to teachings of the present invention.
Figure 9:
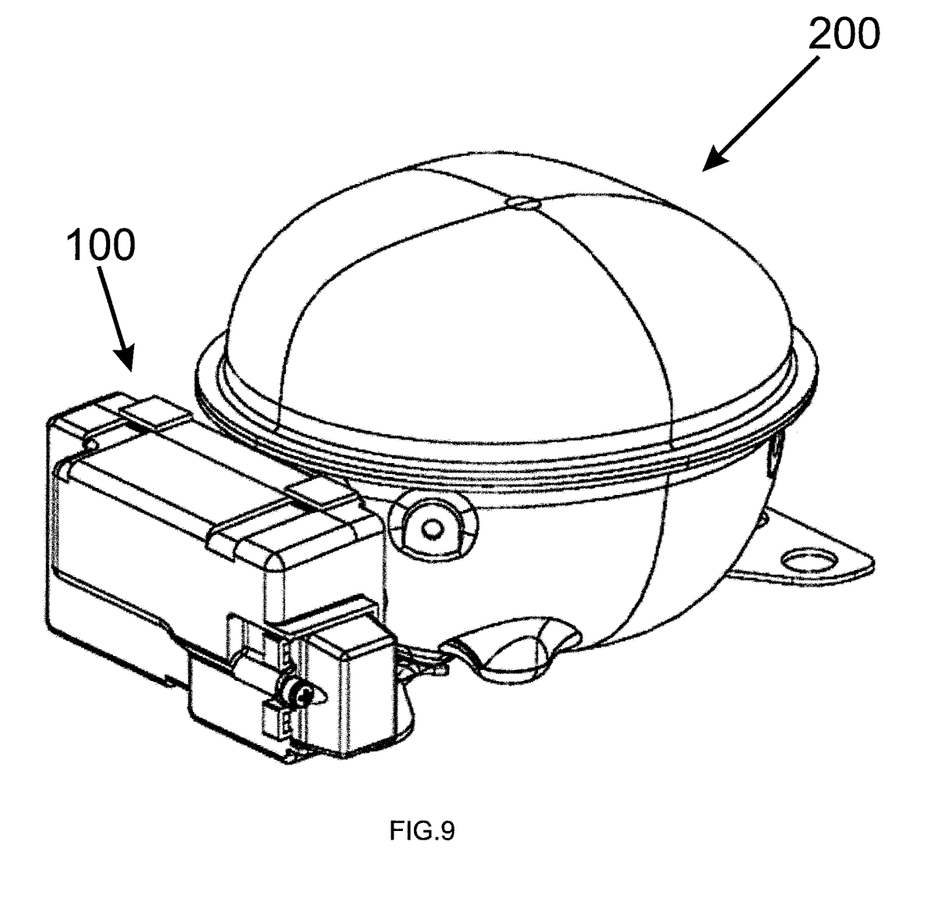
Figure 10:
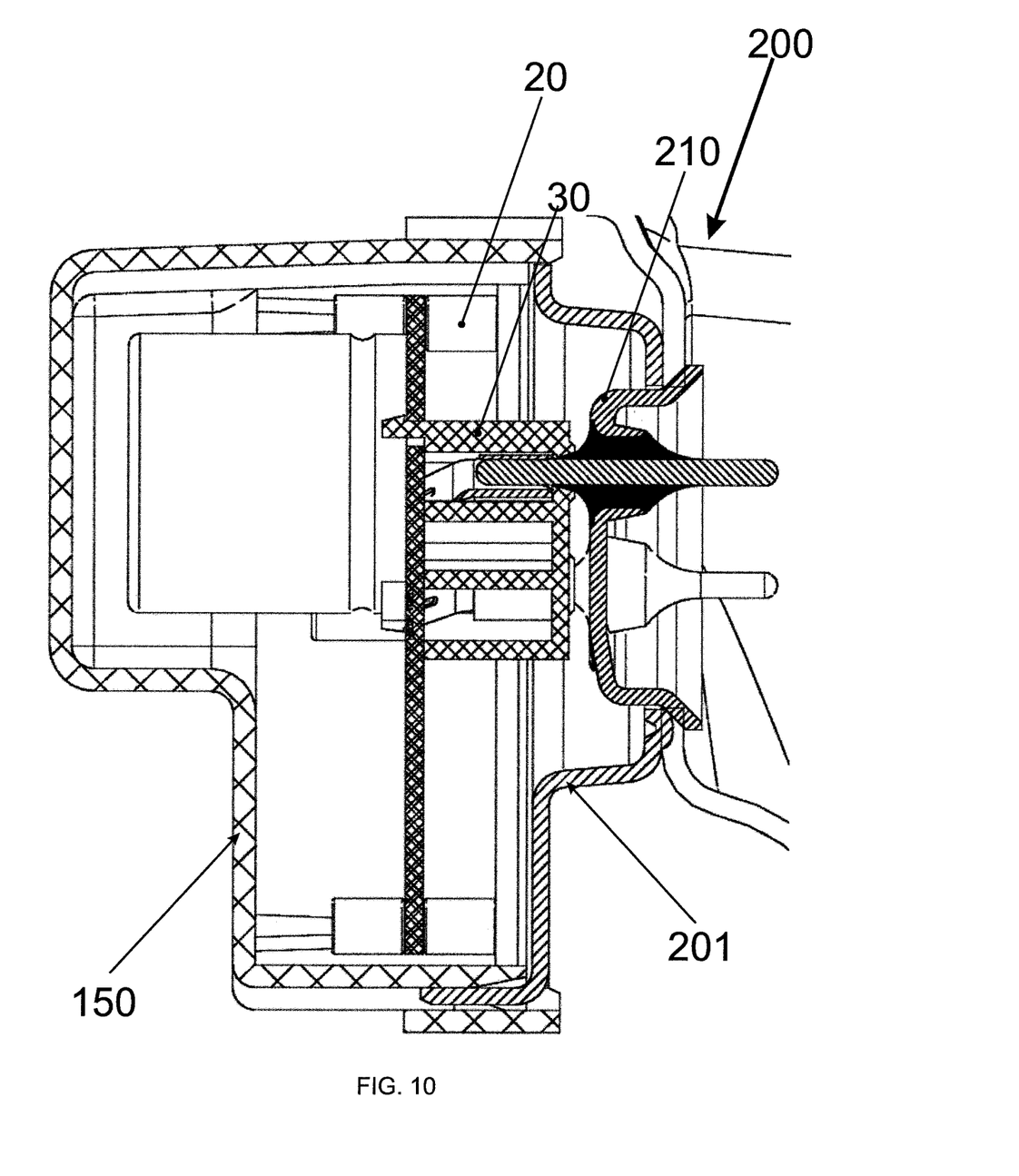
FIG. 10 is a cross-sectional view of the connection and fixation means of the electronic control with the airtight compressor and the outer housing encapsulating the electronic control and attached to the airtight compressor according to teachings of the present invention.

One observes in FIGS. 8 to 10 the completed mounting of the connection and fixation means 100 onto the airtight compressor 200.

As pointed out before, the present invention brings a number of advantages over the prior art, less time and fewer steps for mounting at the production lines, mess plastic materials used on the outer housing 150, economy in saving cables, handiness in mounting, dismounting, maintaining, changing components, low production costs, among others.

A preferred example of embodiment having been described, it should be understood that the scope of the present invention embraces other possible variations, being limited only by the contents of the accompanying claims, which include the possible equivalents.

The invention claimed is:

1. An arrangement for connecting and fixing an electronic control to an airtight compressor, said arrangement comprising:
  a printed-circuit board;
  an outer housing; and
  an electronic-control connector;
  wherein the electronic control and the electronic-control connector are arranged on the printed-circuit board, the electronic control connector being electrically connected to the electronic control,
  the printed-circuit board simultaneously:
    establishing contact with the airtight compressor; and
    establishing electric connection with the airtight compressor by an electric connection between the electronic-control connector and an airtight-compressor connector;
  the outer housing encapsulating the printed-circuit board and being fixed to the fence of the airtight compressor.

2. The arrangement for connecting and fixing an electronic control to an airtight compressor according to claim 1, wherein the printed-circuit board further establishes a grounding of an electromagnetic interference filtering circuit of the electronic control with the airtight compressor.

3. The arrangement for connecting and fixing an electronic control to an airtight compressor according to claim 2, wherein the grounding of the electromagnetic interference filtering circuit of the electronic control with the airtight compressor is established by means of an electric connection between a ground-connection point of the printed-circuit board and the fence of the airtight compressor.

4. The arrangement for connecting and fixing an electronic control to an airtight compressor according to claim 1, wherein the printed-circuit board is provided with a first face and a second face.

5. The arrangement for connecting and fixing an electronic control to an airtight compressor according to claim 4, wherein the first face and the second face are opposite between each other and faced, respectively, to the outer housing and to the fence of the airtight compressor.

6. The arrangement for connecting and fixing an electronic control to an airtight compressor according to claim 4, wherein the electronic control and the electronic-control connector are arranged on the second face of the printed-circuit board.

7. The arrangement for connecting and fixing an electronic control to an airtight compressor according to claim 6, wherein the contact with the airtight compressor is established by means of a contact between the second face of the printed-circuit board and the fence of the airtight compressor.

8. The arrangement for connecting and fixing an electronic control to an airtight compressor according claim 4, wherein the means comprises at least one resting means fixed on the first and second faces of the printed-circuit board.

9. The arrangement for connecting and fixing an electronic control to an airtight compressor according to claim 8, wherein the at least one resting means arranged on the second face of the printed-circuit board establishes contact with the fence of the airtight compressor.

10. The arrangement for connecting and fixing an electronic control to an airtight compressor according to claim 8, wherein during the encapsulation, the outer housing established a contact with the at least one resting means arranged on the first face of the printed-circuit board.

11. The arrangement for connecting and fixing an electronic control to an airtight compressor according to claim 8, wherein the at least one resting means is made from elastically deformable materials.

12. The arrangement for connecting and fixing an electronic control to an airtight compressor according to claim 1, wherein the electronic control is a frequency inverter.

13. The arrangement for connecting and fixing an electronic control to an airtight compressor according to claim 1, wherein the outer housing is provided with an inner cavity and an opening.

14. The arrangement for connecting and fixing an electronic control to an airtight compressor according to claim 13, wherein external feed terminals are accessible from the opening of the outer housing.

15. The arrangement for connecting and fixing an electronic control to an airtight compressor according to claim 13, wherein the opening is closed by a cover and fixed by means of fixing element.

16. The arrangement for connecting and fixing an electronic control to an airtight compressor according to claim 1, wherein the fixation of the outer housing is made by means of notches of the fence of the airtight compressor.

17. The arrangement for connecting and fixing an electronic control to an airtight compressor according to claim 1, wherein the outer housing is made from plastic materials.

18. The arrangement for connecting and fixing an electronic control to an airtight compressor according to claim 1, wherein the outer housing is made from metallic materials.

19. The arrangement for connecting and fixing an electronic control to an airtight compressor according to claim 1, wherein the electronic-control connector and the airtight compressor are provided with at least three connections.

20. A system for connecting and fixing an electronic control to an airtight compressor wherein:
   the electronic control comprises one electronic-control connector, the electronic-control connector being electrically connected to the electronic control; and
   the airtight compressor comprises a fence and an airtight-compressor connector,
   the system establishing, simultaneously, an electrical connection between the electronic-control connector and the airtight-compressor connector and a contact between the electronic control and the fence of the airtight compressor,
   the electronic control being encapsulated by an outer housing, the outer housing being fixed to the fence of the airtight compressor.

21. A method for connecting and fixing an electronic control to an airtight compressor comprising the steps:
   moving the electronic control toward the airtight compressor until an electronic-control connector and an airtight compressor connector are aligned with each other;
   establishing a contact between the electronic control and the airtight compressor;
   establishing an electric connection between the electronic-control connector and the airtight-compressor connector;
   encapsulating the electronic control with an outer housing; and
   fixing the outer housing to a fence of the airtight compressor.

22. An airtight compressor controlled by an electronic control wherein:
   the electronic control comprises one electronic-control connector, the electronic-control connector being electrically connected to the electronic control; and
   the airtight compressor comprises a fence and an airtight-compressor connector,
   the airtight compressor establishing simultaneously an electric connection with the electronic-control connector and a contact with the electronic control,
   the electronic control being encapsulated by an outer housing, the outer housing being fixed to the fence of the airtight compressor.

* * * * *